US008010635B2

(12) United States Patent
Richter (10) Patent No.: US 8,010,635 B2
(45) Date of Patent: Aug. 30, 2011

(54) METHOD AND SYSTEM FOR THIN CLIENT CONFIGURATION

(75) Inventor: Bryan Michael Richter, Fremont, CA (US)

(73) Assignee: Wyse Technology Inc., San Jose, CA (US)

( * ) Notice: Subject to any disclaimer, the term of this patent is extended or adjusted under 35 U.S.C. 154(b) by 220 days.

(21) Appl. No.: 12/206,678

(22) Filed: Sep. 8, 2008

(65) Prior Publication Data

US 2009/0006587 A1 Jan. 1, 2009

Related U.S. Application Data

(62) Division of application No. 11/132,204, filed on May 19, 2005.

(51) Int. Cl.
*G06F 15/177* (2006.01)
(52) U.S. Cl. ....................................................... 709/220
(58) Field of Classification Search .................. 709/203, 709/220, 217
See application file for complete search history.

(56) References Cited

U.S. PATENT DOCUMENTS

| | | | |
|---|---|---|---|
| 5,452,454 A | 9/1995 | Basu | |
| 5,819,042 A | 10/1998 | Hansen | |
| 5,920,863 A | 7/1999 | McKeehan et al. | |
| 6,029,246 A | 2/2000 | Bahr | |
| 6,098,098 A | 8/2000 | Sandahl et al. | |
| 6,110,229 A | 8/2000 | Yamaguchi | |
| 6,202,206 B1 | 3/2001 | Dean et al. | |
| 6,308,205 B1 | 10/2001 | Carcerano et al. | |
| 6,370,646 B1 | 4/2002 | Goodman et al. | |
| 6,516,316 B1 * | 2/2003 | Ramasubramani et al. | 707/9 |
| 6,601,096 B1 | 7/2003 | Lassiter, Jr. | |
| 6,609,150 B2 | 8/2003 | Lee et al. | |
| 6,735,691 B1 | 5/2004 | Capps et al. | |
| 6,738,803 B1 | 5/2004 | Dodrill et al. | |
| 7,376,650 B1 * | 5/2008 | Ruhlen | 707/6 |
| 2002/0048449 A1 | 4/2002 | Mineyama | |
| 2002/0065879 A1 | 5/2002 | Ambrose et al. | |
| 2002/0072956 A1 | 6/2002 | Willems et al. | |
| 2002/0098840 A1 | 7/2002 | Hanson et al. | |
| 2002/0147972 A1 * | 10/2002 | Olmeda et al. | 717/174 |
| 2002/0165945 A1 | 11/2002 | Buswell et al. | |
| 2002/0194289 A1 * | 12/2002 | Engel et al. | 709/208 |
| 2003/0023676 A1 | 1/2003 | Slater | |
| 2003/0088545 A1 | 5/2003 | Subramaniam et al. | |
| 2003/0115326 A1 | 6/2003 | Verma et al. | |
| 2004/0044751 A1 | 3/2004 | Doraisamy | |
| 2004/0054717 A1 | 3/2004 | Aubry et al. | |

(Continued)

FOREIGN PATENT DOCUMENTS

EP 0 358 292 3/1990

(Continued)

*Primary Examiner* — Ario Etienne
*Assistant Examiner* — El Hadji Sall
(74) *Attorney, Agent, or Firm* — McDermott Will & Emery LLP (57) ABSTRACT

A method for configuring a thin client connected to a communications network includes the thin client sending a request for a network address to an address server. The address server sends an assigned network address back to the thin client together with a location of a configuration server. The thin client sends a request for configuration information to the configuration server. The request for configuration information includes information on the thin client. The configuration server generates a configuration file containing configuration information based on the received thin client information. The configuration file is then sent by the configuration server to the thin client, which uses the configuration file for configuration.

31 Claims, 4 Drawing Sheets

U.S. PATENT DOCUMENTS

| | | |
|---|---|---|
| 2004/0083281 A1 | 4/2004 | Makagon et al. |
| 2004/0148526 A1* | 7/2004 | Sands et al. ............... 713/202 |
| 2004/0268413 A1* | 12/2004 | Reid et al. ................. 725/131 |
| 2005/0160098 A1* | 7/2005 | Campbell et al. ............ 707/10 |
| 2005/0198233 A1* | 9/2005 | Manchester et al. ......... 709/221 |
| 2006/0177014 A1* | 8/2006 | Skakkebaek et al. ....... 379/67.1 |
| 2006/0242228 A1 | 10/2006 | Eggers et al. |
| 2009/0043798 A1* | 2/2009 | Tan et al. .................. 707/102 |

FOREIGN PATENT DOCUMENTS

| | | |
|---|---|---|
| EP | 0 750 766 | 8/1997 |
| EP | 0 793 170 | 9/1997 |
| EP | 0 845 742 | 6/1998 |
| WO | WO 00/54149 | 9/2000 |

* cited by examiner

METHOD AND SYSTEM FOR THIN CLIENT CONFIGURATION

CROSS REFERENCE TO RELATED APPLICATIONS

This application is a divisional application of U.S. application Ser. No. 11/132,204, which was filed on May 19, 2005 which is hereby incorporated by reference herein.

FIELD OF THE INVENTION

The present invention concerns thin client computing systems, and in particular concerns a method and system for configuring thin client devices.

BACKGROUND OF THE INVENTION

Thin client systems combine the benefits of mainframe computing with the functionality provided by personal computers (PCs). Thin client systems are server-centric systems in which applications and data are centrally hosted on one or more servers. Thin client devices access the applications and data using a minimal amount of software and hardware. By keeping the applications and data centrally located on servers, thin client systems are capable of providing high levels of security and centralized management of the applications and data. However, conventional thin client systems generally involve significant amounts of administrative overhead to configure and maintain the thin client devices.

One approach for configuring thin client devices is for an administrator to configure each device individually. This approach allows the administrator to tailor the configuration to the specific needs and available resources of each thin client device. The administrator loads any necessary software and enters individual configuration settings for each thin client device in the system. Unfortunately, the flexibility afforded by this approach is offset by the administrative burden of configuring and tracking the configuration and software used in each thin client device. For enterprise systems using a large number of thin client devices, this burden can become overwhelming and cost prohibitive.

Recent developments in thin client systems have provided mechanisms for thin client devices to download configuration information and software from a server using the File Transfer Protocol (FTP). Distributing configuration information and software using FTP servers reduces the administrative overhead required to configure large numbers of thin client devices. But, the convenience of using FTP servers comes at the expense of the available flexibility in configuring each thin client device.

For example, the FTP servers must store either a single configuration file for use by all thin client devices or must store multiple configuration files with each configuration file being associated with one or more specific thin client devices in the system. Whenever the configuration of a particular thin client device needs to be changed, or a new thin client device is added to the system, an administrator must either modify an existing configuration file or create a new configuration file and associate that file with the particular thin client device. For large thin client systems, an administrator must decide between using a single configuration file for all thin client devices and maintaining a large number of configuration files and respective associations with the thin client devices in the system.

Accordingly, a need exists for a new system to configure thin client devices that is both centrally managed and flexible. The new system should be centrally managed to reduce administrative overhead needed to configure and maintain large thin client systems. The new system should also be flexible enough to provide configurations suited to each thin client device's individual resources and needs.

SUMMARY OF THE INVENTION

The present invention addresses the foregoing concerns by providing new method and system for configuring thin clients in a thin client computing system. The invention uses information about a particular thin client to tailor a configuration file to the needs of that thin client. The thin client information is provided by the thin client to a configuration server when requesting configuration information from the server. Using a configuration application or script, the configuration server generates a configuration file containing configuration information tailored for the thin client based on the received thin client information.

Accordingly, the present invention provides a centralized approach to configuring thin client devices connected to a communications network. By providing information on the thin client to the configuration server, and using that information to tailor an appropriate configuration file, different thin client devices can be correctly configured with minimal administrative overhead.

According to one aspect of the invention, a thin client connected to a communications network sends a request for a network address. An assigned network address and a location of a configuration server are received from an address server. A request for configuration information is then sent to the configuration server. The request for configuration information includes thin client information. A configuration file containing configuration information is received from the configuration server. The configuration file is generated by the configuration server based on the thin client information. The thin client is then configured using the configuration information contained in the configuration file.

According to another aspect of the invention, a request for a network address is received from a thin client connected to a communications network. An assigned network address and a location of a configuration server are sent to the thin client. A request for configuration information from the thin client is received, where the request for configuration information includes thin client information. A configuration file containing configuration information is generated based on the thin client information. The configuration file is then sent to the thin client, which uses the configuration file to configure the thin client.

According to another aspect of the invention, a thin client configuration system is provided for configuring a thin client connected to a communications network. The system includes an address server for sending a network address to the thin client via the communications network in response to an address request received from the thin client. A location of a configuration server is included with the network address sent to the thin client. The configuration server generates a configuration file containing configuration information in response to a request for configuration information received from the thin client. The configuration file is generated based on thin client information included with the request for configuration information. The configuration server then sends the generated configuration file to the thin client. The configuration file is used to configure the thin client.

Preferably, the address server is a Dynamic Host Configuration Protocol (DHCP) server and the configuration server is a Hypertext Transfer Protocol (HTTP) server. The location of the configuration server is preferably included in a DHCP tag, which also identifies the protocol of the configuration server. The location of the configuration server is preferably provided as a Uniform Resource Locator (URL) and the thin client information is included in a URL line of a request for configuration information.

Preferably, the thin client information includes information on the hardware configuration of the thin client, the software configuration of the thin client and information on any peripheral devices connected to the thin client.

Preferably, the configuration file is generated by an application or script executed on the configuration server.

The foregoing summary of the invention has been provided so that the nature of the invention can be understood quickly. A more detailed and complete understanding of the preferred embodiments of the invention can be obtained by reference to the following detailed description of the invention together with the associated drawings.

DETAILED DESCRIPTION OF THE INVENTION

Figure 1:
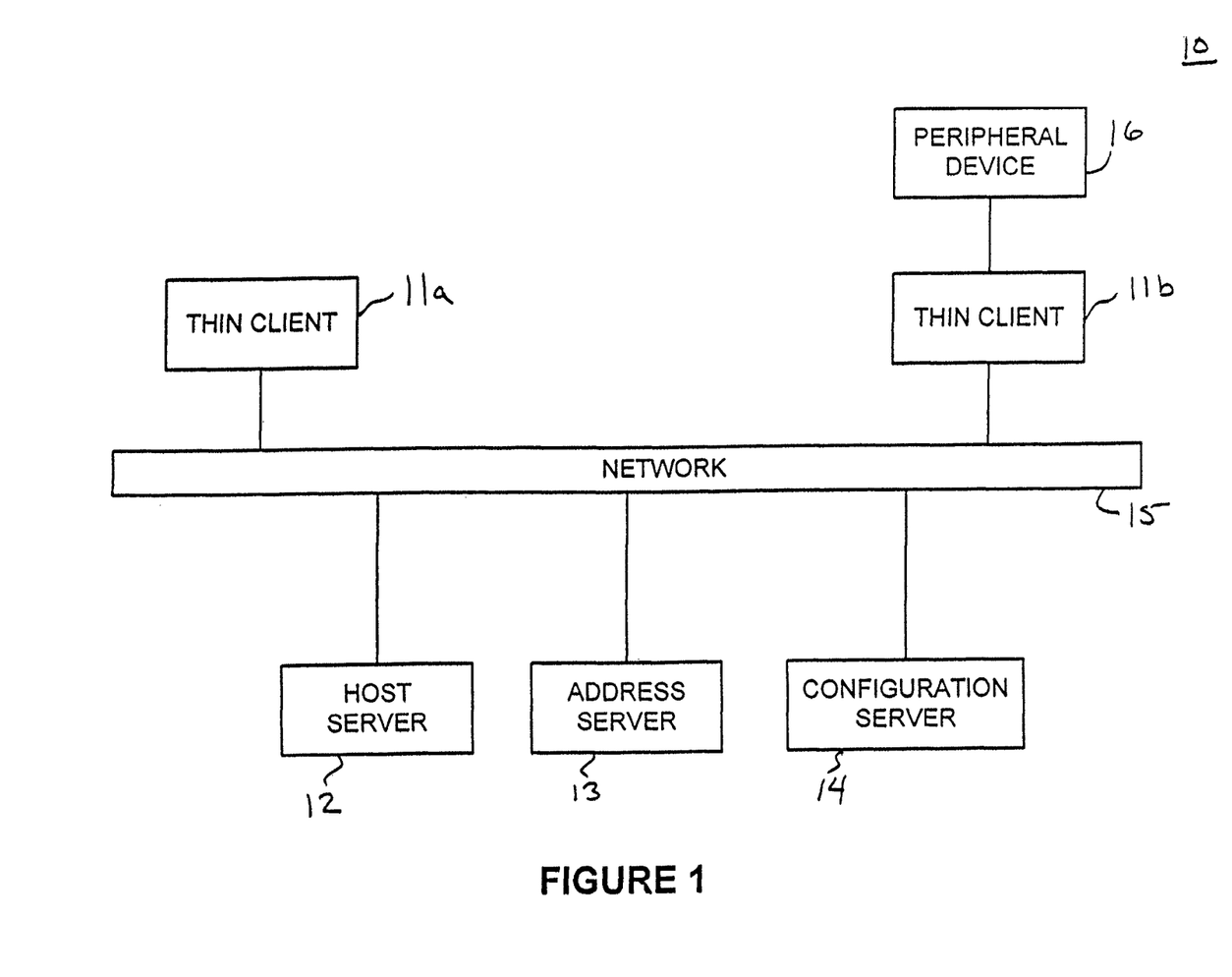
FIG. 1 is a block diagram depicting the primary components of a thin client system according to one embodiment of the invention.

FIG. 1 is a block diagram depicting the main components of a thin client system according to one embodiment of the invention. Thin client system 10 depicted in FIG. 1 includes thin clients 11a and 11b, host server 12, address server 13 and configuration server 14. Thin clients 11a and 11b and servers 12 to 14 are interconnected by network 15. Also included in thin client system 10 is peripheral device 16, which is connected to thin client 11b. The system configuration depicted in FIG. 1 is only one example of a thin client system and is not intended to limit the scope of the invention. Different numbers of the respective components and different network configurations can be used in alternative embodiments without departing from the scope of the invention.

Thin client system 10 is a network-centric computing system in which applications and data are hosted centrally on host server 12. Thin clients 11a and 11b are computing devices that provide user access to the centrally hosted applications and data via a graphical user interface (GUI). Using a remote-computing protocol, mouse movements/clicks and keystrokes are transmitted from thin client 11a or 11b to host server 12 via network 15. Application processing and data storage are executed on host server 12 in accordance with the received mouse movements/clicks and keystrokes. Screen updates based on the application processing and data storage are then transmitted back to thin client 11a or 11b via network 15 to be displayed using the thin client's GUI.

Network 15 is a communications network for transmitting data between connected components. Network 15 can be a local area network (LAN) or a wide area network (WAN) using any of a number of conventional networking protocols such as Ethernet. Thin clients 11a and 11b and servers 12 to 14 can be connected to network 15 using a variety of conventional network connections. For example, twisted pair, coaxial, or fiber optic cables can be used to connect to network 15. One or more components can be connected to network 15 using wireless connections. In addition, components can be connected to network 15 through public phone lines using a modem or through the Internet using any of a number of known protocols. Additionally, network 15 can be a mixed-use network that allows both the network-centric computing system of the present invention as well as other conventional networked computing systems to operate simultaneously.

Thin clients 11a and 11b can be implemented using any of a number of known computing devices. Possible computing devices include, but are not limited to, personal digital assistants (PDAs), thin-client appliances and personal computers (PCs). The computing devices can be connected to a peripheral device depending on the computing devices hardware and software configurations. As shown in FIG. 1, thin client 11b represents a thin client computing device that is connected to peripheral device 16. Peripheral device 16 represents any of the number of know peripheral devices, which include printers and scanners.

Figure 2:
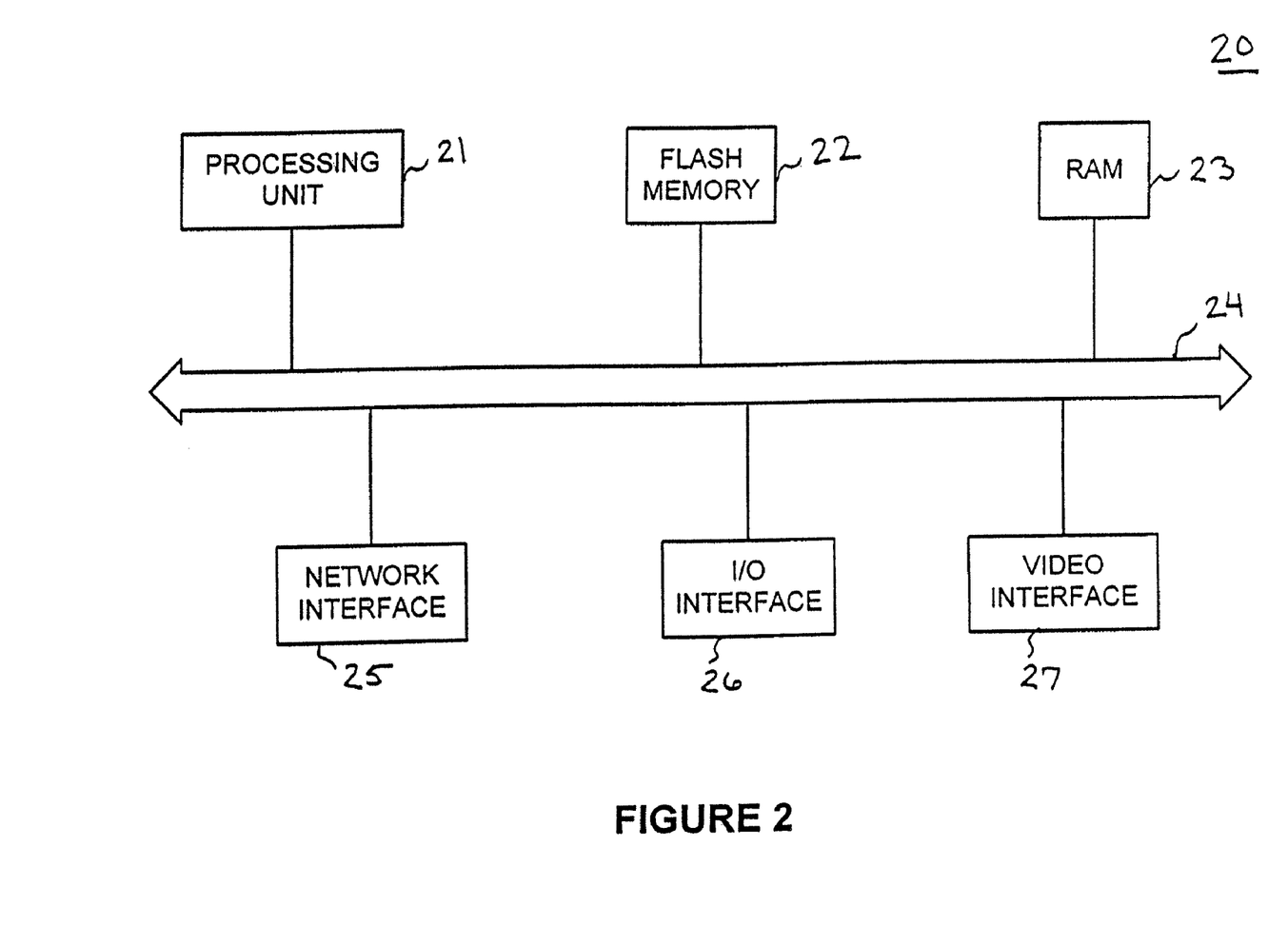
FIG. 2 is a block diagram depicting a hardware architecture of a thin client device according to one embodiment of the invention.

FIG. 2 is a block diagram depicting the hardware architecture of a thin client computing device according to one embodiment of the invention. As shown in FIG. 2, thin client device 20 includes processing unit 21, flash memory 22 and random-access memory (RAM) 23, each interfaced with bus 24. Also interfaced with bus 24 are network interface 25, I/O interface 26 and video interface 27.

Processing unit 21 is a microprocessor for executing instruction sequences of software modules stored in the thin client system memory. The thin client system memory is comprised of flash memory 22 and RAM 23. Bus 24 represents any of a number of known internal bus structures for transferring data between components of thin client device 20. Network interface 25 facilitates communication between thin client device 20 and network 15. I/O interface 26 facilitates communication between thin client device 20 and user input devices such as a mouse and a keyboard. I/O interface 26 also facilitates communication between thin client device 11 and any connected peripheral devices, such as a printer or scanning device. Video interface 27 facilitates communication between thin client device 20 and a video display system for displaying the GUI used in the operation of thin client device 20.

Flash memory 22 is a non-volatile memory medium for storing the software modules used to operate thin client device 20. It is to be understood that flash memory is only one type of memory medium that can be used to implement the invention. Other types of memory media known to those skilled in the art can be used in alternative embodiments of the invention. The software modules stored in flash memory 22 include an operating system and a remote-computing protocol client. Other software modules stored in flash memory 22 may include web browsers/clients, device drivers for connected peripheral devices and various user applications such as word processors.

The operating system used to control and manage the resources of thin client device 20 is not limited to a single type of operating system. Embodiments of the invention can use a proprietary operating system designed to meet the requirements of a unique system environment. Other embodiments of the invention can use a Microsoft Windows based operating system, such as Windows CE or Windows XP Embedded, or a Linux based operating system. The foregoing operating systems are provided as examples. One skilled in the art will recognize that other operating systems can be used without departing from the scope of the invention.

The remote-computing protocol client uses one or more protocols for transferring user input from thin client device 20 to host server 12. The one or more protocols are also used to transfer screen updates from host server 12 to thin client device 20. The invention is not limited to the use of a single type of remote-computing protocol. Possible protocols include, but are not limited to, Microsoft Remote Desktop Protocol (RDP), Citrix Independent Computing Architecture (ICA) and Virtual Network Computing (VNC).

FIG. 2 depicts only one embodiment of a thin client device used in the present invention. As mentioned above, many types of computing devices can be used as thin clients in the present invention. Each of these types of computing devices can have hardware architectures that differ from that depicted in FIG. 2.

Returning to FIG. 1, three servers are shown connected to network 15: host server 12, address server 13 and configuration server 14. As mentioned above, host server 12 centrally hosts applications and data accessed by thin clients 11*a* and 11*b*. Address server 13 assigns and manages network addresses of computing devices connected to network 15. Configuration server 14 generates configuration files used by thin client devices connected to network 15 to configure themselves. The operation of these servers will be described in more detail below.

FIG. 1 depicts host server 12, address server 13 and configuration server 14 as three individual servers. This implementation represents only one embodiment of the invention. Any two of these servers, or all three servers, can be combined into a single server computing system. Alternatively, one or more of these servers can be implemented using a group of servers.

Figure 3:
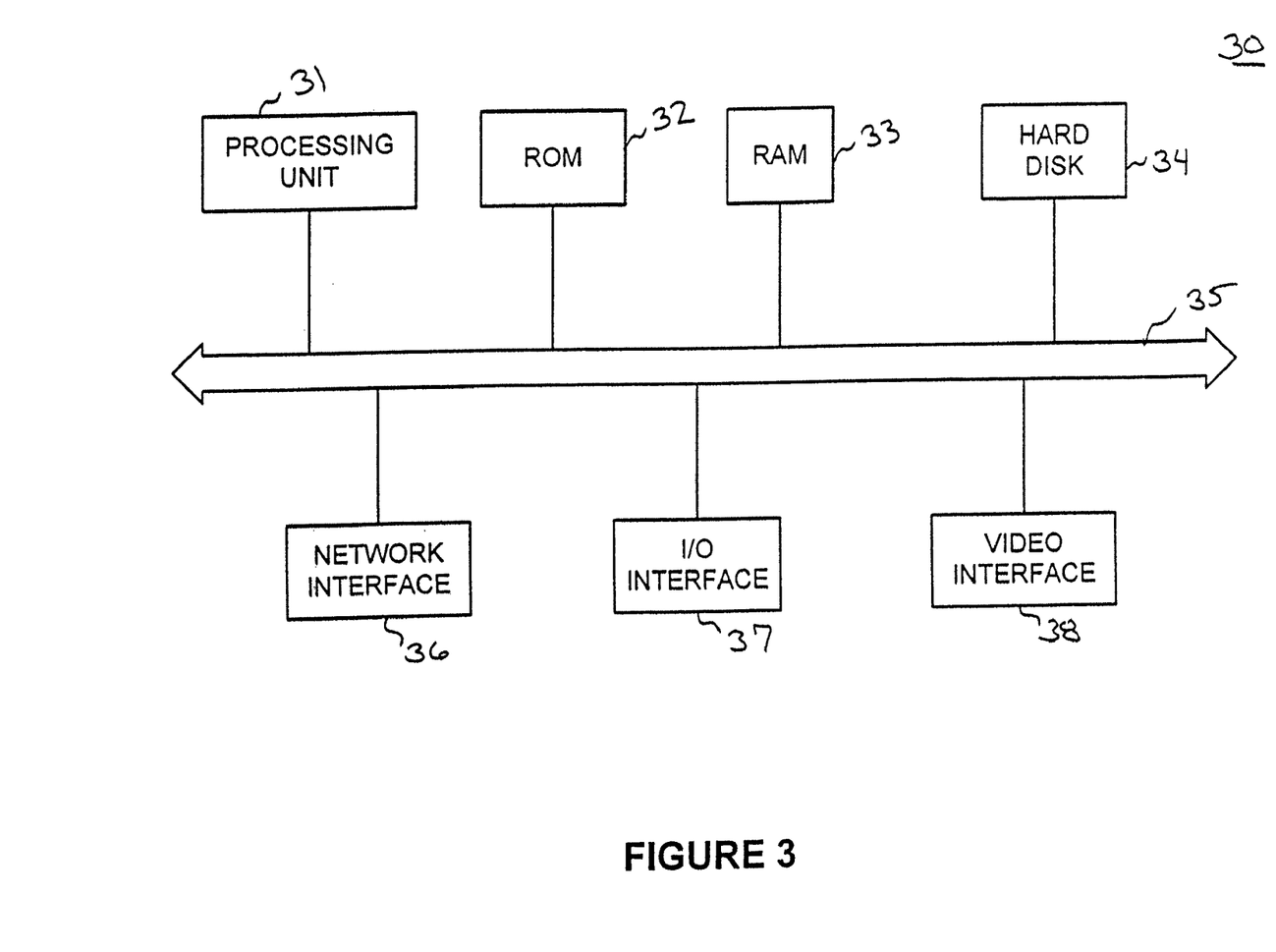
FIG. 3 is a block diagram depicting a hardware architecture of a server computing system suitable for use in the present invention.

FIG. 3 is a block diagram depicting a hardware architecture of a server suitable for use as host server 12, address server 13 or configuration server 14 according to one embodiment of the invention. As shown in FIG. 3, server 30 includes processing unit 31, read-only memory (ROM) 32, RAM 33 and hard disk 34, each interfaced with bus 35. Also interfaced to bus 35 are network interface 36, I/O interface 37 and video interface 38.

Processing unit 31 is a microprocessor for executing instruction sequences of software modules stored in the system memory, which includes ROM 32 and RAM 33. ROM 32 stores a basic input/output system (BIOS) for controlling communications between components within server 30. RAM 33 provides a workspace for processing unit 31 to execute instruction sequences and manipulate data associated with those instruction sequences. Hard disk 34 is a non-volatile computer memory medium for storing software modules used to implement of the functions of server 30. Other embodiments of the invention may use removable magnetic media, optical media, and other types of computer-readable memory media to store the software modules. Additionally, arrays of the respective media types can be used to store the software modules.

Bus 35 represents any of a number of known bus structures for transferring data between components of server 30. Network interface 36 facilitates communication between server 30 and network 15. I/O interface 37 facilitates communication between server 30 and user input devices such as a mouse and a keyboard. I/O interface 37 also facilitates communication between server 30 and any connected peripheral devices, such as a printer or scanning device. Video interface 38 facilitates communication between server 30 and a video display system.

The software modules stored and executed by server 30 include, but are not limited to, an operating system, one or more user applications, a server application for facilitating access to the one or more user applications using a remote-computing protocol and device drivers for peripheral devices connected to server 30. Server 30 also stores and executes server applications used to implement the functionality provided by host server 12, address server 13 and/or configuration server 14. The particular server applications will be apparent to those skilled in the art based on the operation of these servers described below.

FIG. 3 depicts only one embodiment of the architecture of a server used to implement the present invention. One skilled in the art will recognize other server configurations that can be used to implement alternative embodiments without departing from the scope of the invention.

Figure 4:
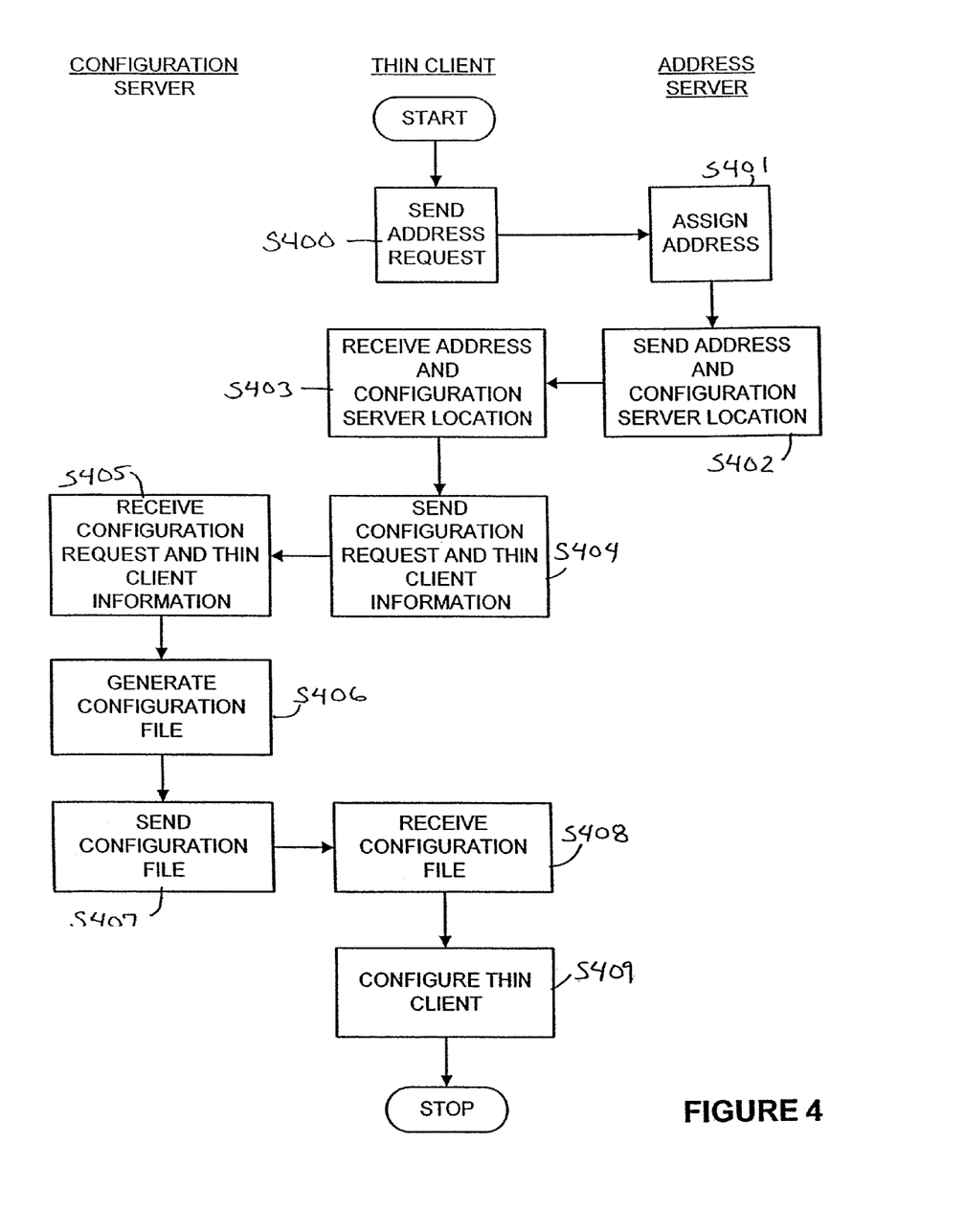
FIG. 4 is a flowchart depicting a process for configuring a thin client device according to one embodiment of the invention.

FIG. 4 is a flowchart depicting a process for configuring a thin client device according to one embodiment of the invention. The process is designed to configure thin client devices connected to a thin client system while minimizing administrative overhead. The process begins when a thin client device is connected to the network of a thin client system and powered up to boot the thin client device's operating system.

In step S400, the thin client device sends a request via the network for a network address. The address server receives the request and assigns an address to the requesting thin client device in step S401. The assigned address is sent by the address server to the requesting thin client device in step S402. According to a preferred embodiment of the invention, the thin client device requests a network address and the address server assigns a network address using the Dynamic Host Configuration Protocol (DHCP). Alternative embodiments of the invention, however, may use other address-assignment protocols.

In addition to the assigned network address, the address server sends network information to the thin client device. This network information includes the network addresses of network servers, such as domain servers, as well as network parameters used to facilitate communications within the network. In the preferred embodiment, this network information is sent to the thin client device using DHCP tags. Those skilled in the art will recognize other network information that can be included with the assigned network address sent to the thin client device.

The address server also includes the location of a configuration server with the assigned network address sent in step S402. Preferably, the location is identified using a Uniform Resource Locator (URL), which identifies both a server and a protocol for communicating with the server. Alternatively, the location of the configuration server can be identified using the network address and the relevant communications protocol for the configuration server. In the preferred embodiment of the invention, the location of the configuration server is provided to the thin client device using DHCP tags. The thin client device receives the assigned network address and the DHCP tags in step S403.

Once the thin client device has received the location of the configuration server, a request for configuration information is prepared and sent to the configuration server in step S404. The present invention provides an intelligent configuration system in which the configuration information returned to the thin client device is tailored to meet the needs of the particular device. To achieve this result, a robust protocol is necessary for communications between the thin client device and the configuration server. In a preferred embodiment of the invention, the Hypertext Transfer Protocol (HTTP) is used for communications with the configuration server. Secure versions of HTTP can be used in alternative embodiments requiring additional security.

The thin client device uses the location information of the configuration server to send the request for configuration information. To assist the configuration server in tailoring the configuration information to the needs of the particular thin client device, information on the thin client is included with the request. The thin client information includes information on the identification, current hardware configuration and current software configuration of the thin client device.

The identification information of the thin client device is obtained from information stored in the thin client device and from information received from the address server. The identification information includes, but is not limited to, the Media Access Control (MAC) address of the thin client device, the network address assigned to the thin client device by the address server and the name and model number of the thin client device.

The current hardware configuration information of the thin client device includes information on both the internal hardware components of the thin client device and any peripheral devices connected to the thin client device. The hardware configuration information includes, but is not limited to, the type of processing unit, the amount of memory, the amount of free space in the memory and the identification of any peripheral devices connected to the thin client device. This information is typically stored in the thin client device and is regularly updated to reflect changes to the hardware configuration. Preferably, the thin client device detects its current hardware configuration and any connected peripheral devices during boot up and updates the hardware configuration information accordingly.

The software configuration information lists the software modules currently installed on the thin client device and identifies the respective versions of those software modules.

The thin client device forwards the thin client information with the HTTP request sent to the configuration server. The thin client information can be appended to the end of the configuration server's URL used to request the configuration information. Alternatively, the thin client information can be sent in a packet separate from the URL, which allows the thin client information to be encrypted. Those skilled in the art will recognize other methods for sending this information to the configuration server with the HTTP request.

In step S405, the configuration server receives the HTTP request with the thin client information from the thin client device. Using the thin client information, the configuration server generates a configuration file containing configuration information tailored for the particular thin client device in step S406. The configuration server generates the configuration file using an application or script identified in the URL. The application or script can be written in any of a number of known programming languages, such as Perl, Java, C++, etc.

The configuration application or script analyzes the thin client information and generates a configuration file. The configuration file contains configuration information used to configure the thin client device. This configuration information includes software updates, new software add-ons, instructions for obtaining software updates or add-ons, updated device drivers, user privileges for accessing network applications and resources, modifications to the GUI displayed by the thin client device, etc. The configuration file is generated by the application or script either by selecting a configuration file from a database of configuration files based on the thin client information or, alternatively, dynamically constructing the configuration file based on the thin client information.

Once the configuration file has been generated by the configuration server in step S406, the configuration file is sent to the requesting thin client device in step S407. The thin client device receives the configuration file in step S408 and uses the configuration file to configure itself in step S409. The configuration of the thin client may involve replacing software modules installed on the thin client device, installing new software modules on the thin client device, following instructions for requesting and receiving software modules from another server besides the configuration server, etc. Configuration may also modify the GUI of the thin client device to reflect access privileges to certain applications and data on the host server. Configuring the thin client device may require the device to be re-booted to complete the update of software modules. This can be done immediately after the new software modules have been received or the new software modules can be stored until the next time the thin client device is booted.

In addition to providing individualized configuration information to the thin client devices connected to the network, the present invention provides a simple mechanism for tracking the thin client devices. Using the thin client information sent by the thin client devices to the configuration server, the configurations of each of the connected thin client devices can be centrally tracked and managed. Furthermore, desired changes to thin client device configurations can be made at the configuration server by modifying the application or script that generates the configuration file.

FIG. 1 depicts configuration server 14 being connected to thin clients 11a and 11b via network 15. As mentioned above, configuration server 14 is preferably an HTTP server. Using HTTP for the configuration server simplifies routing through the network and is easier to maintain than other servers, such as FTP servers. Additionally, configuration server 14 can be located anywhere in communication with thin clients 11a and 11b. For example, configuration server 14 can be located at a remote location connected to network 15 via the Internet. In this manner, a single configuration server can be used to provide configuration files for thin clients connected to several different networks interconnected by the Internet.

The foregoing detailed description is intended to illustrate preferred embodiments of the invention. However, the examples set forth above are not intended to limit the scope of the invention, which should be interpreted using the claims set forth below. It is to be understood that various modifications to the illustrated examples of the invention can be made without departing from the spirit and scope of the invention.

What is claimed is:

1. A method for configuring a thin client device, the method comprising:

facilitating sending a request for a network address via a communications network;

receiving an assigned network address and a location of a configuration server from an address server via the communications network;

facilitating sending a request for configuration information to the configuration server via the communications network, wherein the request for configuration information includes thin client information;

receiving a configuration file containing configuration information from the configuration server via the communications network, wherein the configuration server is configured to generate the configuration file based on the thin client information; and configuring the thin client device using the configuration information contained in the configuration file,
wherein the configuration server is configured to dynamically construct the configuration file based on the thin client information using an application or script.

2. The method according to claim 1, wherein the request for a network address is broadcast on the communications network.

3. The method according to claim 1, wherein the address server is a Dynamic Host Configuration Protocol (DHCP) server.

4. The method according to claim 3, wherein the location of the configuration server is included in a DHCP tag.

5. The method according to claim 1, wherein a protocol of the configuration server is received with the location of the configuration server.

6. The method according to claim 1, wherein the configuration server is a Hypertext Transfer Protocol (HTTP) server.

7. The method according to claim 1, wherein the configuration server is a Secure Hypertext Transfer Protocol (HTTPS) server.

8. The method according to claim 1, wherein the location of the configuration server is a Uniform Resource Locator (URL).

9. The method according to claim 8, wherein the thin client information is included in a URL line of the request for configuration information.

10. The method according to claim 8, wherein the thin client information is separate from a URL line of the request for configuration information.

11. The method according to claim 8, wherein the thin client information is encrypted.

12. The method according to claim 1, wherein the thin client information includes information on a hardware configuration of the thin client device.

13. The method according to claim 1, wherein the thin client information includes information on a software configuration of the thin client device.

14. The method according to claim 1, wherein the thin client information includes information on a peripheral device attached to the thin client device.

15. The method according to claim 1, wherein the configuration file is generated by a script executed on the configuration server.

16. The method according to claim 1, wherein the configuration file is generated by an application executed on the configuration server.

17. A non-transitory computer-readable medium or media containing computer-executable instructions for implementing a method for configuring a thin client device, the method comprising:
   facilitating sending a request for a network address via a communications network;
   receiving an assigned network address and a location of a configuration server from an address server via the communications network;
   facilitating sending a request for configuration information to the configuration server via the communications network, wherein the request for configuration information includes thin client information;
   receiving a configuration file containing configuration information from the configuration server via the communications network, wherein the configuration server is configured to generate the configuration file based on the thin client information; and
   configuring the thin client device using the configuration information contained in the configuration file,
   wherein the configuration server is configured to dynamically construct the configuration file based on the thin client information using an application or script.

18. A thin client device, comprising:
   a processor-readable medium or media containing executable instructions; and
   a processor configured to execute the instructions contained in said processor-readable medium or media to implement a method for configuring the thin client device, the method comprising:
      facilitating sending a request for a network address via a communications network;
      receiving an assigned network address and a location of a configuration server from an address server via the communications network;
      facilitating sending a request for configuration information to the configuration server via the communications network, wherein the request for configuration information includes thin client information;
      receiving a configuration file containing configuration information from the configuration server via the communications network, wherein the configuration server is configured to generate the configuration file based on the thin client information; and
      configuring the thin client device using the configuration information contained in the configuration file,
      wherein the configuration server is configured to dynamically construct the configuration file based on the thin client information using an application or script.

19. The method according to claim 1, wherein the thin client information comprises identification information, current hardware configuration and current software configuration of the thin client device.

20. The method according to claim 1, further comprising:
   detecting, at boot up, current hardware configuration and any peripheral device connected to the thin client device; and
   updating the thin client information based on the detecting,
   wherein the request for configuration information comprises the updated thin client information,
   wherein the configuration server is configured to dynamically construct the configuration file based on the updated thin client information received from the thin client device.

21. The method according to claim 1, wherein the application or script is identified in a Uniform Resource Locator (URL).

22. The method according to claim 1,
   wherein the configuration server is configured to analyze the thin client information, and
   wherein the configuration server is configured to generate the configuration file without selecting the configuration file from a database of configuration files.

23. The method according to claim 12, wherein the information on the hardware configuration comprises information on internal hardware components of the thin client device and peripheral devices connected to the thin client device.

24. The method according to claim 13, wherein the information on the software configuration comprises information on software modules currently installed on the thin client device.

25. The method according to claim 1, wherein the configuration server comprises the address server, the address server comprises the configuration server, the configuration server is the address server, or the configuration server and the address server are combined into a server.

26. A method for configuring a thin client device, the method comprising:
- detecting current hardware configuration of the thin client device and any peripheral device connected to the thin client device;
- updating thin client information of the thin client device based on the detecting;
- facilitating sending a request for configuration information to a configuration server via a communications network, wherein the request for configuration information includes the updated thin client information;
- receiving a configuration file containing configuration information from the configuration server via the communications network, wherein the configuration server is configured to generate the configuration file based on the updated thin client information received from the thin client device; and
- configuring the thin client device using the configuration information contained in the configuration file,
- wherein the configuration server is configured to dynamically construct the configuration file based on the updated thin client information using an application or script.

27. A non-transitory computer-readable medium or media containing computer-executable instructions for implementing the method according to claim 26.

28. The non-transitory computer-readable medium or media according to claim 27, wherein the updated thin client information comprises identification information, the current hardware configuration and current software configuration of the thin client device.

29. The non-transitory computer-readable medium or media according to claim 27, wherein the application or script is identified in a Uniform Resource Locator (URL).

30. The non-transitory computer-readable medium or media according to claim 27,
- wherein the detecting is performed at boot up, and
- wherein the configuration server is configured to generate the configuration file without selecting the configuration file from a database of configuration files.

31. The thin client device comprising a processor-readable medium or media containing executable instructions, and a processor configured to execute the instructions contained in said processor-readable medium or media to implement the method according to claim 26.

* * * * *

UNITED STATES PATENT AND TRADEMARK OFFICE
CERTIFICATE OF CORRECTION

PATENT NO. : 8,010,635 B2  Page 1 of 1
APPLICATION NO. : 12/206678
DATED : August 30, 2011
INVENTOR(S) : Bryan Michael Richter It is certified that error appears in the above-identified patent and that said Letters Patent is hereby corrected as shown below:

IN THE FRONT PAGE:

(56) References Cited: Add --Benefits of a Network Boot Thin Client, Automation Control Products--

IN THE DRAWINGS

Sheet 4, Fig. 4: Replace "  " with --  --

Signed and Sealed this
Twenty-first Day of February, 2012

David J. Kappos
*Director of the United States Patent and Trademark Office*